June 11, 1929.　　W. G. BROWNE　　1,717,184
ADVERTISING SERVICE VEHICLE
Filed June 19, 1928
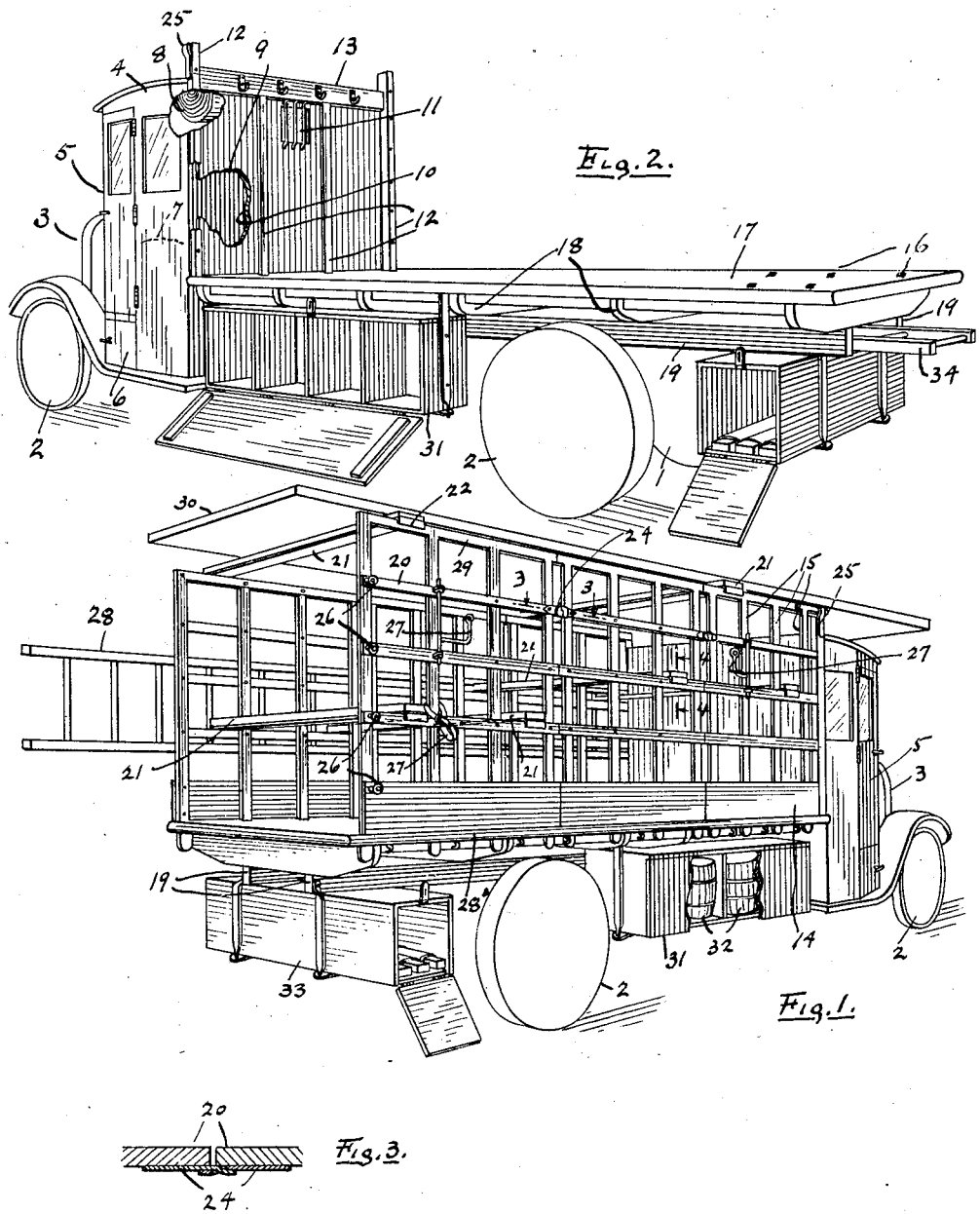
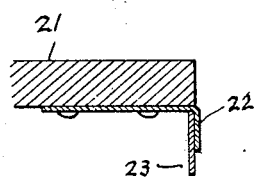
WILLIAM G. BROWNE INVENTOR
BY
ATTORNEY Patented June 11, 1929.

1,717,184

UNITED STATES PATENT OFFICE.

WILLIAM G. BROWNE, OF YONKERS, NEW YORK.

ADVERTISING SERVICE VEHICLE.

Application filed June 19, 1928. Serial No. 286,523.

This invention relates to service vehicles for use in the installation and equipment of advertising signboards, and has for its general object the provision of such a vehicle as an automobile truck with a body specially adapted to receive and transport the various structural elements required and the implements used in the erection and maintenance of signboard structures.

Among other objects of the invention is the provision of a vehicle body having a forward compartment for the crew, and a skeleton body portion arranged rearwardly of this personnel compartment and so disposed relatively thereto as to permit some of the longer structural elements and implements to extend forward past a portion of the personnel compartment, while being properly supported by, and secured to, the skeleton body.

Further objects comprise provisions for the safety of the crew, and for convenience of access to the various articles carried by the vehicle; also for an unusual degree of adjustability of the supporting members of the skeleton vehicle body; and for utilization of all the space available upon the vehicle to receive a varied and extensive load.

The above, and other features of the invention, are illustrated and described fully in the accompanying drawings and specification, and are pointed out in the claim.

In the drawings,

Fig. 1 is a view in perspective of an automobile truck in the construction of which the invention has been embodied.

Fig. 2 is a similar view from a different viewpoint, and with the skeleton sides removed from the platform of the body.

Fig. 3 is a detail view in section on the line 3—3 of Fig. 1.

Fig. 4 is a detail view in section on the line 4—4 of Fig. 1.

In the now-preferred embodiment of the invention illustrated, the chassis of the vehicle is designated by the reference character 1, having wheels 2 and an engine compartment 3 of any suitable type.

At the forward end at 4 is the cab for the personnel having side doors 5, a tool compartment 6, and being provided with a seat for the crew, indicated in dotted lines at 7. Above this seat the space overhead may be utilized for a roll 8 of supply material or equipment, such as paper, canvas or tarpaulin. Spaced a short distance behind the rear wall 9 of this cab is placed the front wall of the skeleton body which comprises an armor 10 of heavy sheet iron, (see broken away portion in Fig. 2) capable of resisting the thrust of heavy timbers carried by the skeleton body, in the event of a collision and sudden stoppage of the vehicle; the crew are thus protected from injury. A window 11 in this wall is heavily barred, as shown, for a similar purpose.

Uprights 12 and a cross-member 13 constitute a frame-work for this end of the skeleton body, which comprises also skeleton side members 14 having upright stakes 15 set in sockets 16 formed in the platform 17 of the body, the latter being supported by cross-pieces 18 mounted on the longitudinal members 19. The space between the members 19 may be utilized to receive such extended articles as the ladder 34.

These skeleton side members, of which there may be any suitable number, three being shown, on each side, comprise also horizontal members 20 secured to the stakes in vertically spaced relation, and which serve as supports for the ends of adjustable cross-bars 21, the latter having end-irons 22 (see Fig. 4) adapted to engage armor strips 23 on the members 20. At their abutting ends, the adjacent members 20 are provided with interlocking fittings 24, shown in detail in Fig. 3.

The foremost stake 15 on each side is secured to the corner upright 12 by a pivoted clamp 25. The rearmost of the side members is preferably provided with the usual rope studs 26, and brackets are provided at 27, adapted to swing out into position to receive ladders 28, or to be swung back out of the way of flat pieces of equipment, if desired.

The ladders may be secured in place by ties 27, which may be used alternatively to secure other articles in place. Preferably the sides 28' of the platform of the body extend somewhat beyond the upright members 24, to support articles lashed to the uprights.

I claim:

A vehicle of the class described, comprising a body having a forward cab with seats for the crew; and a body comprising a platform and skeleton side frames, with movable and interchangeable cross-bars, said cab having an armored rear wall to protect the crew from forward thrust of the load carried by said cross-bars in the event of collision.

In witness whereof, I have signed this specification.

WILLIAM G. BROWNE.